United States Patent
Wang

(10) Patent No.: US 10,901,535 B2
(45) Date of Patent: Jan. 26, 2021

(54) ACTIVE STYLUS, TOUCH CONTROL DEVICE AND TOUCH CONTROL METHOD

(71) Applicant: BOE TECHNOLOGY GROUP CO., LTD., Beijing (CN)

(72) Inventor: Kaifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/456,531

(22) Filed: Jun. 28, 2019

(65) Prior Publication Data

US 2020/0125187 A1 Apr. 23, 2020

(30) Foreign Application Priority Data

Oct. 18, 2018 (CN) .......................... 2018 1 1213411

(51) Int. Cl.
| | | |
|---|---|---|
| *G06F 3/0354* | (2013.01) | |
| *G06F 3/0346* | (2013.01) | |
| *G06F 3/0488* | (2013.01) | |
| *G06F 3/041* | (2006.01) | |
| *G06F 3/038* | (2013.01) | |

(52) U.S. Cl.
CPC ........ *G06F 3/03545* (2013.01); *G06F 3/0346* (2013.01); *G06F 3/04883* (2013.01); *G06F 3/038* (2013.01); *G06F 3/04162* (2019.05)

(58) Field of Classification Search
CPC ............... G06F 3/03545; G06F 3/0346; G06F 3/04883; G06F 3/04162; G06F 3/038
See application file for complete search history.

(56) References Cited

U.S. PATENT DOCUMENTS

| | | | | |
|---|---|---|---|---|
| 5,357,265 | A | * | 10/1994 | Searby ................ G06F 3/03545 178/19.04 |
| 10,592,510 | B2 | * | 3/2020 | Amin ................. G01N 33/0031 |
| 2004/0017357 | A1 | | 1/2004 | Kinoshita et al. |
| 2016/0231833 | A1 | | 8/2016 | Gu et al. |
| 2017/0139573 | A1 | * | 5/2017 | Li ........................ G06F 3/04845 |
| 2017/0192539 | A1 | | 7/2017 | Fang et al. |
| 2017/0357339 | A1 | * | 12/2017 | Bathiche ............. G06F 3/03545 |
| 2019/0294660 | A1 | * | 9/2019 | Devoe ................... G06F 40/106 |

FOREIGN PATENT DOCUMENTS

| | | |
|---|---|---|
| CN | 1466713 A | 1/2004 |
| CN | 105511648 A | 4/2016 |
| CN | 105637449 A | 6/2016 |
| CN | 106095293 A | 11/2016 |
| CN | 107506059 A | 12/2017 |
| CN | 107953699 A | 4/2018 |

OTHER PUBLICATIONS

First Office Action for Chinese Patent Application No. 201811213411.3 dated Sep. 25, 2019.

* cited by examiner

*Primary Examiner* — Charles V Hicks
(74) *Attorney, Agent, or Firm* — Calfee, Halter & Griswold LLP

(57) ABSTRACT

An active stylus comprising: a pen body, a pen head connected to the pen body, and a first sensor disposed in at least one of the pen body and the pen head. The first sensor is configured to sense attitude information of the active stylus. The active stylus is adapted to realize touch control on the touch control device based on the attitude information, thereby generating an effect of simulating chalk writing and drawing.

18 Claims, 4 Drawing Sheets

ACTIVE STYLUS, TOUCH CONTROL DEVICE AND TOUCH CONTROL METHOD

RELATED APPLICATIONS

The present application claims the benefit of Chinese Patent Application No. 201811213411.3, filed on Oct. 18, 2018, the entire disclosure of which is incorporated herein by reference.

TECHNICAL FIELD

The present disclosure relates to the field of touch control technologies, and more particularly, to an active stylus, a touch control device, and a touch control method.

BACKGROUND

Currently, styluses are divided into passive styluses and active styluses. Unlike a passive stylus, an active stylus can transmit a driving signal to change an electric field at the touch point, thereby changing an electrode capacitance at the touch point. By detecting the change of the electrode capacitance, a control chip of a touch screen of a touch control terminal can determine the position of the touch point (i.e., touch position information). In addition, due to presence of a power supply and a signal transmitting module, the active stylus can also provide status information of the active stylus itself to the touch control terminal.

However, functions of active styluses in the related art are not comprehensive enough, and the advantage of providing status information of the active stylus itself to the touch control terminal is not fully utilized.

SUMMARY

According to exemplary embodiments, there is provided an active stylus, comprising: a pen body, a pen head connected to the pen body, and a first sensor disposed in at least one of the pen body and the pen head, the first sensor being configured to sense attitude information of the active stylus.

In some exemplary embodiments of an active stylus, the active stylus further comprises: a gas passage disposed in the pen body, the gas passage comprising an air inlet disposed at one end of the pen body away from the pen head and an air outlet disposed at a side of the pen body, and a second sensor disposed in the gas passage, the second sensor being configured to sense at least one of a flow rate and pressure of a gas flow entering the gas passage.

In some exemplary embodiments of an active stylus, the second sensor comprises at least one of a varistor, a thin film transistor, and a MEMS based gas pressure sensor.

In some exemplary embodiments of an active stylus, the first sensor comprises at least one of a gyroscope and a gravity sensor.

In some exemplary embodiments of an active stylus, the pen head is wedge shaped.

In some exemplary embodiments of an active stylus, the active stylus further comprises a third sensor disposed in the pen head, the third sensor being configured to sense stress on a tip of the pen head.

According to another exemplary embodiment, a touch control device is provided, comprising the active stylus according to some exemplary embodiments and a touch control apparatus communicably connected to the active stylus; wherein the touch control apparatus comprises:

a touch panel configured to obtain a touch position of the active stylus on the touch panel; and a painting and writing unit configured to generate a painting or calligraphy according to the touch position and the attitude information of the active stylus.

In some exemplary embodiments of a touch control device, the painting and writing unit comprises a first painting and writing subunit configured to: determine a width of a stroke according to the attitude information of the active stylus, and generate the painting or calligraphy according to the width of the stroke.

In some exemplary embodiments of a touch control device, the active stylus further comprises a third sensor disposed in the pen head, the third sensor being configured to sense stress on a tip of the pen head, and the painting and writing unit comprises a second painting and writing subunit configured to: determine a width of a stroke according to stress on the tip of the pen head, and generate a painting or calligraphy according to the width of the stroke.

In some exemplary embodiments of a touch control device, the active stylus further comprises a gas passage disposed in the pen body and a second sensor to sense at least one of a flow rate and pressure of the gas flow entering the gas passage, and wherein the painting and writing unit is further configured to generate a painting or calligraphy according to the touch position, the attitude information, and at least one of the flow rate and the pressure of the gas flow.

In some exemplary embodiments of a touch control device, the touch panel is a touch display screen and further configured to display the painting or calligraphy.

In some exemplary embodiments of a touch control device, the painting and writing unit further comprises a third painting and writing subunit configured to:

determine an initial position of a virtual droplet according to the touch position, determine an initial size, a moving speed, and a moving distance of the virtual droplet according to at least one of the flow rate and the pressure of the gas flow;

determine a position and orientation of the active stylus relative to the touch display screen according to the attitude information of the active stylus and a spatial position information of the touch panel, and determine a moving direction of the virtual droplet according to the position and orientation; and generate the painting or calligraphy according to the initial position, the initial size, the moving speed, the moving direction, and the moving distance of the virtual droplet.

In some exemplary embodiments of a touch control device, the touch control device further comprises a first storage unit configured to store a virtual painting paper, wherein the virtual painting paper comprises rice paper, printing paper, coarse paper, corrugated paper, and coated paper, and the third painting and writing subunit is further configured to select the virtual painting paper from the first storage unit as a background of the painting or calligraphy.

In some exemplary embodiments of a touch control device, the touch control device further comprises a second storage unit configured to store a first table representing a relationship between the initial size and the moving speed of the virtual droplet and at least one of the flow rate and the pressure of the gas flow, a second table representing a degree of size reduction in the process of moving of the virtual droplet on different virtual painting paper, and a third table representing a diffusion length of the virtual droplet penetrating into the virtual painting paper in the process of moving of the virtual droplet on different virtual painting paper, and wherein the third painting and writing subunit is further configured to: determine the initial size, the moving speed, and the moving distance of the virtual droplet according to at least one of the flow rate and the pressure of the gas flow with reference to the first table; and generate the painting or calligraphy according to the initial position, the initial size, the moving direction, the moving speed, and the moving distance of the virtual droplet and virtual paper with reference to the second table and the third table.

According to another exemplary embodiment, there is provided a touch control method for an active stylus, comprising:

obtaining a touch position and attitude information of the active stylus;

generating a painting or calligraphy according to the touch position and attitude information of the active stylus; and displaying the painting or calligraphy.

In some exemplary embodiments of a touch control method for an active stylus, the generating a painting or calligraphy according to the touch position and attitude information of the active stylus comprises: determining a width of a stroke according to the touch position and the attitude information of the active stylus, and generating the painting or calligraphy according to the width of the stroke.

In some exemplary embodiments of a touch control method for an active stylus, the active stylus comprises a gas passage for receiving a gas flow, wherein the method further comprises obtaining at least one of a flow rate and pressure of the gas flow in the gas passage in the active stylus, and wherein the generating a painting or calligraphy according to the touch position and attitude information of the active stylus comprises: generating a painting or calligraphy according to the touch position, attitude information of the active stylus and the at least one of the flow rate and the pressure of the gas flow.

In some exemplary embodiments of a touch control method for an active stylus, the generating a painting or calligraphy according to the touch position, attitude information of the active stylus and the at least one of the flow rate and the pressure of the gas flow comprises:

determining an initial position of the virtual droplet according to the touch position, determining an initial size, a moving speed, and a moving distance of the virtual droplet according to the at least one of the flow rate and the pressure of the gas flow;

determining a position and orientation of the active stylus relative to the touch display screen according to the attitude information of the active stylus and the spatial position information of the touch panel, and determining a moving direction of the virtual droplet according to the position and orientation; and generating the painting or calligraphy according to the initial position, the initial size, the moving speed, the moving direction, and the moving distance of the virtual droplet.

In some exemplary embodiments of the touch control method for an active stylus, the touch control method further comprising:

generating virtual painting paper as a background of the painting or calligraphy, wherein the virtual painting paper comprises rice paper, printing paper, coarse paper, corrugated paper, and coated paper.

BRIEF DESCRIPTION OF THE DRAWINGS

Certain exemplary embodiments will be further described in detail below with reference to the accompanying drawings.

DETAILED DESCRIPTION

Figure 1:
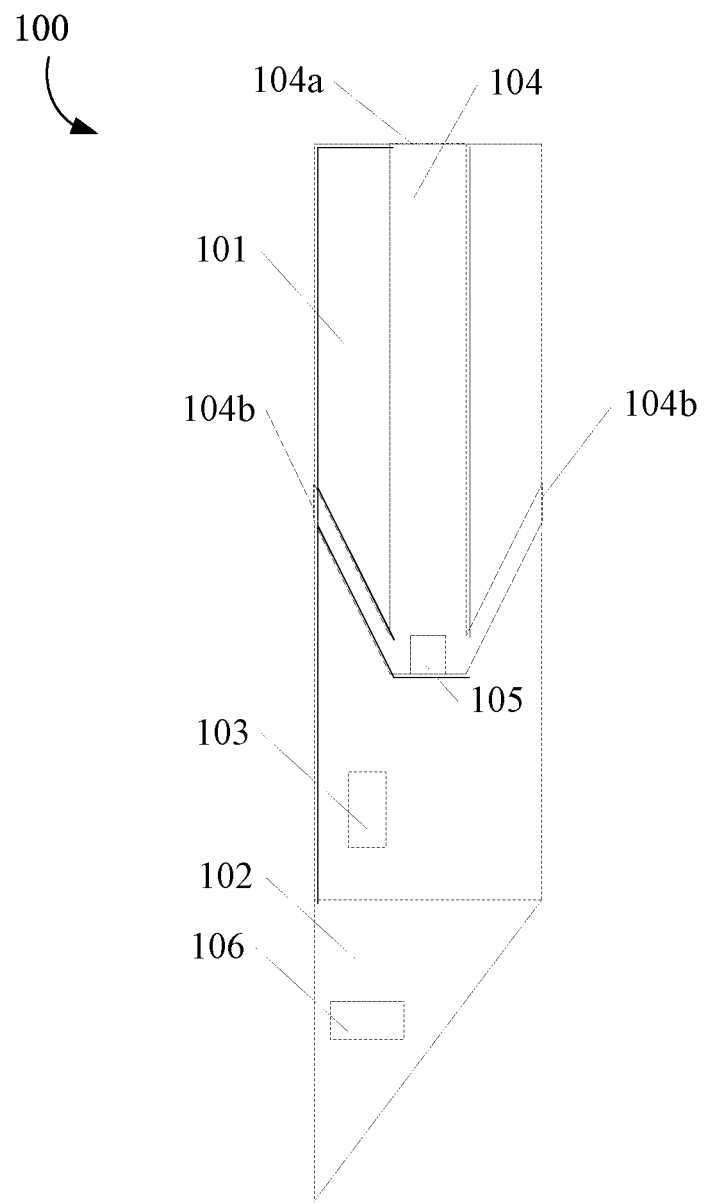
FIG. 1 schematically shows a structural diagram of an active stylus according to some exemplary embodiments.

In order to explain the present disclosure more clearly, the present disclosure will be further described in conjunction with the exemplary embodiments and the accompanying drawings below. Similar components in the drawings are denoted by the same reference numerals. It should be understood by those skilled in the art that the following detailed description is intended to be illustrative and not restrictive and the scope of the present disclosure is not limited in this respect.

FIG. 1 schematically shows a structural diagram of an active stylus according to some exemplary embodiments. As shown in FIG. 1, an active stylus 100 according to some exemplary embodiments comprises: a pen body 101; a pen head 102 connected to the pen body 101; and a first sensor 103 disposed in the pen body 101, the first sensor 103 being configured to sense an attitude information of the active stylus 100. Of course, although not shown in the figure, the first sensor 103 may be disposed in the pen head 102. The active stylus 100 can be used in various touch control apparatuses or touch control terminals, such as a smart phone with a touch screen, a tablet computer, or a notebook computer with a touch pad.

In some exemplary embodiments, the first sensor 103 (or may also be referred to as an attitude sensor) for sensing the attitude of the active stylus 100 may comprise, but is not limited to, at least one of a gyroscope and a gravity sensor. The attitude sensor 103 may comprise various attitude sensing devices such as a three-axis gyroscope, a three-axis accelerometer, a three-axis electronic compass, and a gravity sensor. The attitude information may comprise a variety of angle information that can reflect the rotation, tilt, and the like of the active stylus, which can characterize the attitude and position of the active stylus in the three-dimensional space. In this way, when the active stylus is being operated on the touch screen or the touch panel, the attitude sensor can measure the three-dimensional attitude and position of the stylus itself in real time. After receiving the information, the touch control apparatus can calculate, for example, the tilt angle of the stylus relative to the touch screen according to the specific attitude of the stylus in combination with the position and orientation of the touch screen. After that, the touch control apparatus can determine a width of a stroke for writing or drawing according to the tilt angle, thereby generating an effect of simulating chalk writing and drawing.

In some exemplary embodiments, as shown in FIG. 1, the pen head 102 of the active stylus 100 can be wedge shaped. Such a wedge shape is closer to the actual chalk shape, so it is easier to realize a simulation for the painting and writing ways such as chalk writing, drawing, painting, and the like, and it is easier to produce the effect of chalk painting. Of course, the pen head 102 in the active stylus 100 according to the present disclosure is not limited to a wedge shape, and may be other shapes such as a cylindrical shape, a conical shape, or the like.

In some exemplary embodiments, as shown in FIG. 1, the active stylus 100 may further comprise: a gas passage 104 disposed in the pen body, the gas passage 104 comprising an air inlet 104a disposed at one end of the pen body 101 away from the pen head 102 and an air outlet 104b disposed at a side of the pen body 101; and a second sensor 105 disposed in the gas passage 104 configured to sense physical parameters of a gas flow entering the gas passage 104. As shown in FIG. 1, the air outlet 104b is located on the side of the pen body 101 to facilitate the gas flow entering from the air inlet 104a to be discharged. Through a hydromechanical design, the direction and size of the air outlet 104a and its exhaust passage can export the gas flow entering (e.g., blown in) without affecting the sensing effect of the physical parameters of the gas flow.

In some exemplary embodiments, the physical parameters of the gas flow can comprise a pressure of the gas flow or a flow rate of the gas flow, and the like. Accordingly, the second sensor 105 can be a pressure sensor of the gas flow or a flow rate sensor of the gas flow. Further, the pressure sensor of the gas flow may comprise, for example, a varistor, a thin film transistor or a MEMS based pressure sensor, or the like.

The active stylus 100 according to the present disclosure can be used to simulate a blowpipe graffiti, wherein the stylus 100 with the hollow gas passage 104 is equivalent to a blow pipe, which controls a display content of the touch screen by blowing air to the gas passage when in contact with the touch screen, so as to achieve an effect of the blowpipe graffiti. Specifically, the display content on the touch screen, for example, simulating real writing or painting (comprising blow drawing or child blowpipe graffiti) can be controlled according to information such as the attitude information of the stylus 100 sensed by the first sensor 103, the gas flow parameters when blowing air sensed by the second sensor 105, and the touch position of the stylus 100 sensed by the touch control apparatus when the stylus 100 is in contact with the touch screen. In use, a dedicated APP in the touch control apparatus can be used to enable a user (especially a child) to make use of such active stylus to perform related games and creations in a touch control apparatus such as a tablet computer. For a more specific use method of the active stylus according to some exemplary embodiment, please refer to the touch control method of FIGS. 5-7.

In some exemplary embodiments, as shown in FIG. 1, the active stylus 100 can also comprise a third sensor 106 disposed at the end of the pen head for sensing the stress on a tip of the pen head 102. The third sensor 106 can sense the (user-applied) stress experienced by the pen head 102 from the touch screen as the active stylus 100 contacts the touch screen. In this way, the painting effect of the stylus on the touch screen can be further controlled according to the sensed stress of the pen head 102, so that the characteristics of the real hard pen (fountain pen) or soft pen (brush pen) of writing and drawing can be simulated. For example, the bigger the stress is, the thicker the stroke is, and vice versa.

Moreover, although not shown in FIG. 1, the active stylus 100 can comprise a power source for powering various sensors or other components and a signal transmitter for transmitting signals to the touch control apparatus. The signal transmitter can transmit information about the active stylus 100 (e.g., attitude information, gas flow information, and pen head stress) sensed by the various sensors 103, 105, and 106 to the touch control device. Understandably, the signal transmitter can communicate with the touch control apparatus. It can be understood that the signal transmitter can communicate with the touch control apparatus through wired and wireless means, especially wireless communication means, such as Bluetooth, infrared, Wi-Fi, etc.

Figure 2:
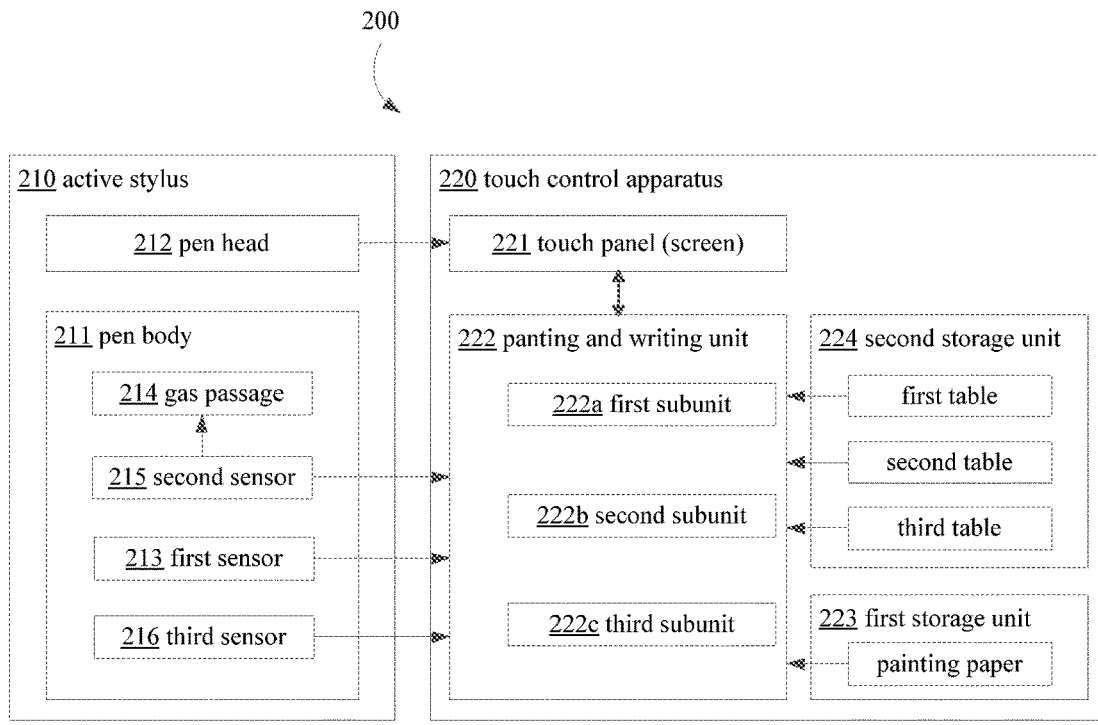
FIG. 2 schematically shows a structure block diagram of a touch control device according to some exemplary embodiments.

FIG. 2 schematically shows a structure block diagram of a touch control device according to some exemplary embodiments. As shown in FIG. 2, the touch control device 200 comprises an active stylus 210 according to some exemplary embodiments and a touch control apparatus 220 communicatively connected to the active stylus 210.

First, as shown in FIG. 2, in the above touch control device 200, the active stylus 210 according to some exemplary embodiments may adopt the active stylus 100 illustrated in FIG. 1 according to some exemplary embodiments. As shown in FIG. 2, the active stylus 210 comprises a pen body 211, a pen head 212, and a first sensor 213 for sensing attitude information of the active stylus 210. In addition, as shown in FIG. 2, the active stylus 210 may further comprise a gas passage 214 (see the gas passage 104 of FIG. 1 for a specific structure) and a second sensor 215 for sensing the gas flow entering the gas passage 214. Further, as shown in FIG. 2, the active stylus 210 may further comprise a third sensor 216 for sensing the stress of the pen head 212. For the specific structure and arrangement of the components 211-216 of the active stylus 210 shown in FIG. 2, reference may be made to the corresponding components 101-106 in FIG. 1, and details are not described herein again.

Secondly, as shown in FIG. 2, the touch control apparatus 220 comprises: a touch panel 221 configured to obtain a touch position of the active stylus 210 on the touch panel 221; and a painting and writing unit 222 configured to generate painting data according to the touch position and attitude information of the active stylus 210. The touch control apparatus 220 can be a variety of different types of computing devices with touch functionality, such as a server of a service provider, a device associated with a client (e.g., a client device), a system on a chip, and/or any other suitable computing device or computing system. Examples of the touch control apparatus 220 comprise, but are not limited to, a desktop computer, a server computer, a notebook computer or netbook computer, a mobile device (e.g., a tablet computer or phablet device, a cellular or other wireless telephone (e.g., a smart phone), a notepad computer, a mobile station), a wearable device (e.g., a intelligent glass or watch), an entertainment device (e.g., an entertainment appliance, a set top box communicatively coupled to a display device, a gaming console), a television or other display devices, an automotive computer, and the like.

In some exemplary embodiments, the touch panel 221 can be a touch display screen 221, which can be used for receiving a touch signal in contact with the stylus, and can also be used as a display for displaying output, such as a touch screen of a smart phone or a tablet computer. For example, the touch display screen 221 can be further configured to display corresponding painting or calligraphy according to the painting data generated by the painting and writing unit 222. Optionally, the touch panel 221 can also be a separate touch input device for receiving input signals of a stylus or other touch input apparatus, such as a touch pad of a notebook. When the touch panel 221 is a conventional touch panel (i.e., does not have a display function), the touch control apparatus 220 may further comprise a separate display for displaying corresponding paintings according to the generated painting data. In addition, generally, the touch panel 221 can sense the contact between the pen head of the active stylus 210 and the touch panel 221 through the touch sensing electrodes mounted thereon, thereby sensing a specific touch position.

The painting and writing unit 222 shown in FIG. 2 represents a unit or module in the touch control apparatus 220 that uses hardware or software or a combination of both to perform one or more operational functions as described in some exemplary embodiments, for example, a module capable of generating painting data according to the touch of the active stylus 210 for display on the display or the touch screen. For example, the painting and writing unit 222 may be a hardware element having a data transmission and processing capability such as a processor, a microprocessor, a single chip microcomputer, a control chip, etc., which is not limited by the material it is made of or the processing mechanism employed therein. For example, a hardware element can be comprised of semiconductor(s) and/or transistors (e.g., an electronic integrated circuit (IC)). The painting data represents elements forming a virtual picture. For ordinary painting, the painting data may comprise a width of a stroke, a moving speed, and the like. For example, for the blow drawing or the blowpipe graffiti, the painting data may comprise a size, moving direction, moving speed, and moving distance of a virtual droplet and a virtual background (painting paper), and so on.

In some exemplary embodiments, as shown in FIG. 2, the painting and writing unit 222 can comprise a first painting and writing subunit 222a configured to determine the width of the stroke in the painting or calligraphy based on the attitude information of the active stylus 210. Here, the first painting and writing subunit 222a is actually used to implement the function of simulating the chalk writing effect described above, that is, to control the width of the written stroke according to the orientation of the stylus 210 relative to the touch panel or the touch screen 221 (such as the angle between the two). For example, in accordance with the writing or drawing of the real chalk, the smaller the angle between the stylus 210 (virtual chalk) and the touch screen 221 (virtual blackboard) is, the thicker or wider the stroke is, and vice versa.

In some exemplary embodiments, the painting and writing unit 222 in the touch control apparatus 220 comprises a second painting and writing subunit 222b configured to determine the width of the stroke for the painting or calligraphy according to the stress of the pen head 212 of the active stylus 210 (sensed by the third sensor 216). In this way, as described above, the active stylus 210 can simulate the effect of the force exerted by a person on the pen on the writing or drawing when a real hard pen (fountain pen) or soft pen (brush pen) is used for writing or drawing. For example, the greater the stress is, the thicker the stroke is, and vice versa.

In some exemplary embodiments, the painting and writing unit 222 can be further configured to generate the painting data according to the touch position, the sensed gas flow, and the attitude information. The painting and writing unit 222 can control the display content on the touch screen, for example, simulating real writing or drawing (e.g., blow drawing or child blowpipe graffiti) according to information such as the attitude information of the stylus sensed by the first sensor 213, the gas flow parameters when blowing air sensed by the second sensor 215, and the touch position of the stylus 210 sensed by the touch control apparatus 220 when the stylus 210 is in contact with the touch screen 221. As described above, in the process of simulating the blowpipe graffiti, the stylus 210 with the hollow gas passage is equivalent to the blow pipe, which controls a display content of the touch screen 221 or a display by blowing air to the gas passage 214 when in contact with the touch screen 221, so as to achieve an effect of the blowpipe graffiti. These painting data or elements can be calculated and generated by liquid or fluid dynamics equations based on the attitude information, touch position, and gas flow information of the active stylus.

In some exemplary embodiments, the painting and writing unit 222 may further comprise a third painting and writing subunit 222c configured to: determine an initial position of the virtual droplet according to the touch position; determine an initial size, a moving speed, and a moving distance of the virtual droplet according to at least one of the flow rate and the pressure of the gas flow; determine a position and orientation of the active stylus 210 relative to the touch panel 221 according to the attitude information of the active stylus 210 and the spatial position information of the touch panel 221, and determine a moving direction of the virtual droplet according to the position and orientation; and generate the painting or calligraphy according to the initial position, the initial size, the moving speed, the moving direction, and the moving distance of the virtual droplet.

The third painting and writing subunit 222c can be used to simulate blowpipe graffiti or drawing process. First, a virtual droplet (for example, an ink for simulating a real fountain pen or a brush pen) is generated according to a touch position of the contact between the pen head 212 of the active stylus 210 and the touch screen 221, with the touch position being the initial position of the virtual droplet. Secondly, according to the attitude of the stylus 210 and the spatial position of the touch screen (or the touch panel) 221, the relative position and orientation of the two are derived, so that the movement trend and direction of the droplet are determined according to the relative position and orientation with reference to the real blow drawing process. Regarding the moving direction, an orientation of a projection of the active stylus 210 on the touch panel 211 can be calculated according to the relative position and orientation of the active stylus 210, and then the orientation of the projection is determined as the moving direction of the droplet. Again, a magnitude of the moving distance of the virtual droplets is determined based on the gas flow information of the stylus (e.g., gas flow rate or pressure). The above data determines the painting or calligraphy effect and constitutes the elements of the painting or calligraphy to be generated, that is, the painting data, and the display or touch screen 221 can display the corresponding painting works accordingly.

In some exemplary embodiments, the third painting and writing subunit 222c may be further configured to determine an initial size of the virtual droplet and a moving speed of the virtual droplet according to the gas flow, thereby realizing a change in the size and moving speed of the droplet with a changing flow rate or pressure of the gas flow, which makes the blow drawing simulation more accurate and more realistic.

In some exemplary embodiments, the touch control apparatus 220 may further comprise a first storage unit 223 and/or a second storage unit 224, wherein the first storage unit used to store a virtual painting paper comprising rice paper, printing paper, coarse paper, corrugated paper, and coated paper. The second storage unit 224 are used to store a first table representing a relationship between a gas physical parameter and an size and a moving speed of a virtual droplet, a second table representing a ratio of size reduction in the process of moving of the virtual droplet on different virtual painting paper at different times, and a third table representing a diffusion length of the virtual droplet penetrating into the virtual painting paper in the process of moving of the virtual droplet on different virtual painting paper.

As shown in Tables 1-3 below, Table 1 (i.e., the first table) represents the relationship between the gas flow rate and the size, moving speed, and moving distance of the virtual droplet, where $V_i$ is the gas flow rate, $A_i$ is the droplet size, $P_i$ is droplet speed, $D_i$ is the droplet moving distance, and $i=1, \ldots, 9$; Table 2 (i.e., the second table) represents a ratio of size reduction of the virtual droplet in the process of moving of the virtual droplet on different virtual painting paper at different times, where $T_i$ represents the time or moment in the process of the movement of the droplet, $R_{ji}$ represents the reduction ratio of the droplet corresponding to the different virtual painting paper at the time of $T_i$ ($i=1, \ldots, 9, j=1, \ldots 5$); and Table 3 (i.e., the third table) represents a diffusion length of the virtual droplet penetrating into the virtual painting paper in the process of moving of the virtual droplet on different virtual painting paper, where $T_i$ represents the time or moment in the process of the movement of the droplet, and $K_{ji}$ represents the diffusion length of the droplet corresponding to the different virtual painting paper at the time of $T_i$ ($i=1, \ldots, 9, j=1, \ldots 5$). In Tables 2 and 3, a sampling frequency can be approximately 60 Hz, so all movements and diffusions between the two samplings and calculations can be approximated as rectilinear and linear. With two adjacent sampling points T1 and T2, the calculation result of T1 is the initial amount of the T2 status calculation. In addition, for the diffusion effect, because it is a gradient color effect, it can be further filled by calling the image with the values of $K_{ij}$, and the simulation effect is better. These correspondence tables can be obtained from many experiments of real painting scenes, so that they can be used in stylus-virtual paintings to reflect their true degree and simulation precision.

TABLE 1

| gas flow rate | droplet size | droplet speed | droplet moving distance |
| --- | --- | --- | --- |
| V1 | A1 | P1 | D1 |
| V2 | A2 | P2 | D2 |
| V3 | A3 | P3 | D3 |
| V4 | A4 | P4 | D4 |
| V5 | A5 | P5 | D5 |
| V6 | A6 | P6 | D6 |
| V7 | A7 | P7 | D7 |
| V8 | A8 | P8 | D8 |
| V9 | A9 | P9 | D9 |

TABLE 2

| | Painting paper | | | | |
| --- | --- | --- | --- | --- | --- |
| Time | rice paper | printing paper | coarse paper | corrugated paper | coated paper |
| T1 | R11 | R21 | R31 | R41 | R51 |
| T2 | R12 | R22 | R32 | R42 | R52 |
| T3 | R13 | R23 | R33 | R43 | R53 |
| T4 | R14 | R24 | R34 | R44 | R54 |
| T5 | R15 | R25 | R35 | R45 | R55 |
| T6 | R16 | R26 | R36 | R46 | R56 |
| T7 | R17 | R27 | R37 | R47 | R57 |
| T8 | R18 | R28 | R38 | R48 | R58 |
| T9 | R19 | R29 | R39 | R49 | R59 |

TABLE 3

| | Painting paper | | | | |
| --- | --- | --- | --- | --- | --- |
| Time | rice paper | printing paper | coarse paper | corrugated paper | coated paper |
| T1 | K11 | K21 | K31 | K41 | K51 |
| T2 | K12 | K22 | K32 | K42 | K52 |
| T3 | K13 | K23 | K33 | K43 | K53 |
| T4 | K14 | K24 | K34 | K44 | K54 |
| T5 | K15 | K25 | K35 | K45 | K55 |
| T6 | K16 | K26 | K36 | K46 | K56 |
| T7 | K17 | K27 | K37 | K47 | K57 |
| T8 | K18 | K28 | K38 | K48 | K58 |
| T9 | K19 | K29 | K39 | K49 | K59 |

When the first storage unit 223 stores the virtual painting paper, the third painting and writing subunit 222c may be further configured to select a virtual painting paper from the first storage unit 223 and generate the painting data according to the selected virtual painting paper. By using the input information of the user (for example, the APP in the touch control apparatus), the virtual painting paper can be selected to generate a painting work using the selected virtual painting paper as a background. In this way, appropriate painting paper can be selected according to information such as needs, the category of the work and the like, to make the produced work more perfect.

In some exemplary embodiments, the third painting and writing subunit 222c may call any one or more of the first table to the third table from the second storage unit 224, thereby directly obtaining required painting parameters (i.e., the size, moving speed, moving direction, moving distance of the droplet, etc.) according to the tables. Specifically, the third painting and writing subunit 222c is further configured to determine an initial size, a moving speed, and a moving distance of the virtual droplet according to physical parameters of the gas flow with reference to the first table; and determine a position, a size, and a diffusion length of the virtual droplet in the process of moving of the virtual droplet on virtual painting paper at different times according to the initial position, the initial size, the moving direction, the moving speed, and the moving distance of the virtual droplet with reference to the second table and the third table, and thereby simulate the movement trajectory of the droplet according to the position, size and the diffusion length of the virtual droplet at different times.

Figure 3:
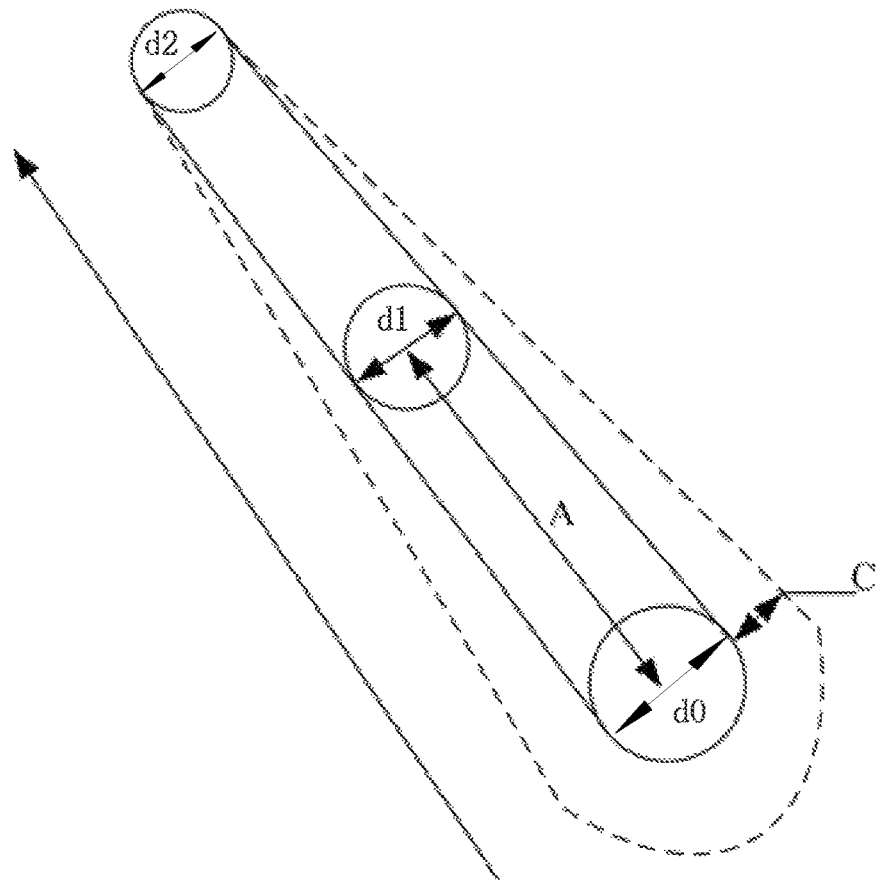
FIG. 3 schematically shows a diagram of virtual droplet movement trajectory of an active stylus during touch control according to some exemplary embodiments.

FIG. 3 shows a schematic diagram of movement of a virtual droplet on a touch screen or display in a process of stimulated blowpipe graffiti of a touch control device in accordance with some exemplary embodiments.

With regard to the second table (see Table 2) and the third table (see Table 3), a size reduction process of the virtual droplet in the process of moving of the virtual droplet on different virtual painting paper and a diffusion length reduction process of the virtual droplet penetrating into the different virtual painting paper in the process of moving are more accurately reflected. As shown in FIG. 3, the single arrow represents the moving direction of the virtual droplet under the touch of the stylus (such as air blowing). The circle O at the lower right represents the initial or original droplet, the diameter of which is d0. The circle O' in the middle represents an intermediate droplet after the original droplet O has passed the moving distance A, and has a diameter d1. The circle O" at the upper left represents a terminal droplet having a diameter d2. As is apparent from FIG. 3, d0>d1>d2, that is, as the droplet moves, its size (or diameter) becomes smaller and smaller, because the liquid or ink in the droplet is less and less, which happens to be consistent with real painting or blow drawing. Further, the dotted line in FIG. 3 represents the diffusion range of the virtual droplet penetrating into the painting paper over time in the moving process of the virtual droplet, where C represents the diffusion length of the droplet size at any time in the moving process. It can also be seen from the figure that as the droplet moves, the diffusion length gradually decreases as the ink gradually decreases.

As described above, the touch control device according to some exemplary embodiments of the present disclosure can derive corresponding original size, moving speed, moving direction, moving distance of the virtual droplet, the diffusion length (and/or diffusion rate) of the virtual droplet penetrating into the virtual painting paper as the virtual droplet moves and the size reduction of the virtual droplet as the virtual droplet moves according to the touch position of the active stylus, the attitude information of the active stylus or the orientation of the active stylus relative to the touch screen, and the flow rate or pressure of the gas flow entering the stylus. Therefore, based on the liquid or fluid dynamics equation, the movement trajectory of the virtual droplet (as shown in FIG. 3) can be calculated and generated, which is the painting data. In this way, the display screen or the touch screen can display the corresponding painting work according to the calculated movement trajectory or painting data.

Figure 4:
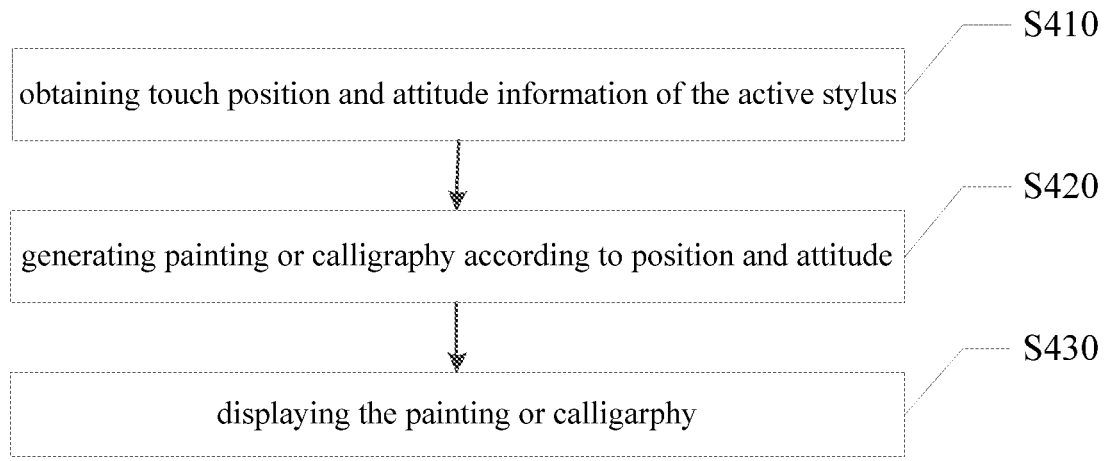
FIG. 4 schematically shows a flow chart of a touch control method for an active stylus according to some exemplary embodiments.

FIG. 4 schematically shows a flow chart of a touch control method for an active stylus according to some exemplary embodiments. As shown in FIG. 4, the touch control method comprises:

S410, obtaining touch position and attitude information of the active stylus

S420, generating a painting or calligraphy according to the touch position and attitude information of the active stylus; and S430, displaying the painting or calligraphy.

Figure 5:
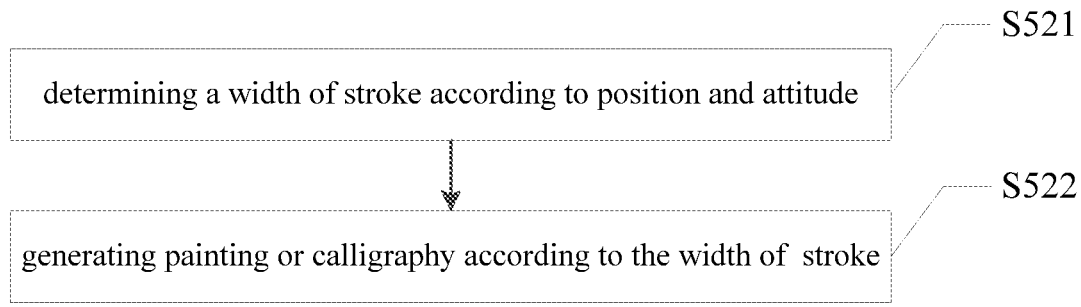
FIG. 5 schematically shows a flow chart of a touch control method for an active stylus according to other exemplary embodiments.

FIG. 5 shows a flow chart of a touch control method for an active stylus according to other exemplary embodiments. Specifically, FIG. 5 shows a flow chart of step S420 in the touch control method shown in FIG. 4. As shown in FIG. 5, the step S420 shown in FIG. 4 of generating a painting or calligraphy according to the touch position and attitude information of the active stylus comprises:

S521, determining a width of a stroke for the painting or calligraphy according to the touch position and the attitude information of the active stylus, and S522, generating a painting or calligraphy according to the width of the stroke.

Figure 6:
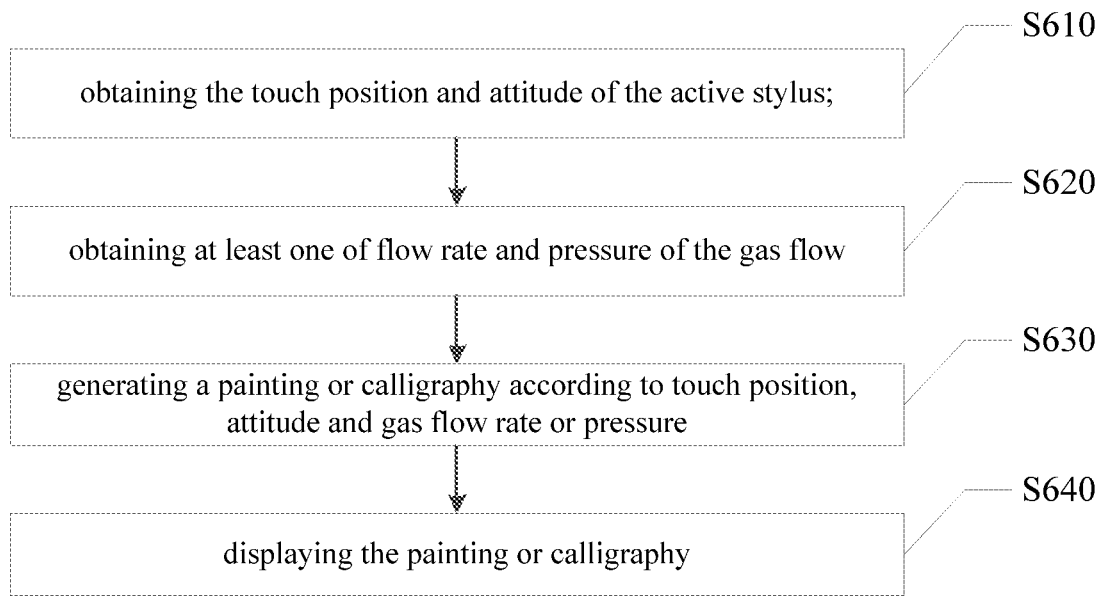
FIG. 6 schematically shows a flow chart of a touch control method for an active stylus according to further exemplary embodiments.

FIG. 6 shows a flow chart of a touch control method for an active stylus according to further exemplary embodiments. In the touch control method shown in FIG. 4, the active stylus comprises a gas passage for receiving a gas flow, and as shown in FIG. 6, the touch control method comprises:

S610, obtaining the touch position and attitude information of the active stylus;

S620: obtaining at least one of a flow rate and pressure of the gas flow in the gas passage in the active stylus;

S630, generating a painting or calligraphy according to the touch position, attitude information of the active stylus and at least one of the flow rate and pressure of the gas flow; and S640, displaying the painting or calligraphy.

Figure 7:
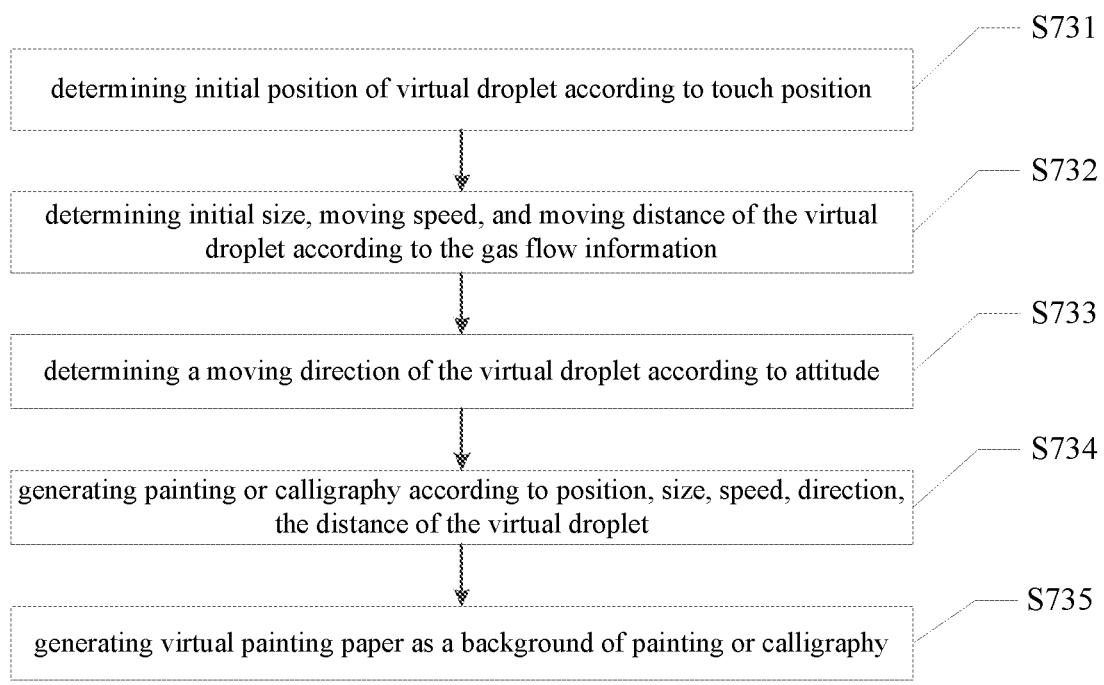
FIG. 7 shows a flow chart of a touch control method for an active stylus according to still further embodiments of the present disclosure.

FIG. 7 shows a flow chart of a touch control method for an active stylus according to still further exemplary embodiments. As shown in FIG. 7, the step S630 shown in FIG. 6 of generating a painting or calligraphy according to the touch position, attitude information of the active stylus and at least one of the flow rate and pressure of the gas flow comprises:

S731, determining an initial position of the virtual droplet according to the touch position, S732, determining an initial size, a moving speed, and a moving distance of the virtual droplet according to at least one of the flow rate and the pressure of the gas flow;

S733, determining a position and orientation of the active stylus relative to the touch display screen according to the attitude information of the active stylus and the spatial position information of the touch panel, and determining a moving direction of the virtual droplet according to the position and orientation; and S734, generating the painting or calligraphy according to the initial position, the initial size, the moving speed, the moving direction, and the moving distance of the virtual droplet.

In some exemplary embodiments, as shown in FIG. 7, the step S630 showed in FIG. 6 of generating a painting according to the touch position, attitude information of the active stylus and physical parameters the gas flow may further comprise:

S735, generating virtual painting paper as a background of the painting or calligraphy, wherein the virtual painting paper comprises rice paper, printing paper, coarse paper, corrugated paper, and coated paper.

It should be noted that the specific implementation processes of the above-described touch control methods for the active stylus according to some embodiments of the present disclosure shown in FIGS. 4-7 may refer to detailed descriptions of the active stylus and touch control device according to some exemplary embodiments presented herein.

Reference throughout this specification to "one exemplary embodiment," "certain exemplary embodiments," "one or more exemplary embodiments" or "an exemplary embodiment" means that a particular feature, structure, material, or characteristic described in connection with the embodiment is included in at least one embodiment of the disclosure. Thus, the appearances of the phrases such as "in one or more exemplary embodiments," "in certain exemplary embodiments," "in one exemplary embodiment" or "in an exemplary embodiment" in various places throughout this specification are not necessarily referring to the same embodiment of the disclosure. Furthermore, the particular features, structures, materials, or characteristics may be combined in any suitable manner in one or more embodiments. Further, the features described or illustrated in connection with one exemplary embodiment may be combined with the features of other embodiments provided that they are not mutually contradictory.

Moreover, the terms "first" and "second" etc. are used for descriptive purposes only and are not to be construed as indicating or implying a relative importance or implicitly indicating the number of technical features indicated. Thus, features defined by "first" or "second" may comprise at least one of the features, either explicitly or implicitly. In the description of the present disclosure, the meaning of "a plurality" is at least two, such as two, three, etc., unless specifically defined otherwise.

Any process or method description in the flowcharts or otherwise described herein may be understood to represent a module, segment or portion of code comprising one or more executable instructions for implementing the steps of a custom logic function or process. And the scope of the preferred embodiments of the present disclosure comprises additional implementations in which the functions may be performed in an order not shown or discussed, comprising in a substantially simultaneous manner or in the reverse order depending on the function involved, which should be understood by those skilled in the art to which the embodiments of the present disclosure pertain.

The logic and/or steps represented in the flowchart or otherwise described herein, for example, which can be considered as ordered listings of executable instructions for implementing logical functions, can be embodied in any computer readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable medium" can be any means that can contain, store, communicate, propagate, or transport the program for use by or in connection with the instruction execution system, apparatus, or device. More specific examples of the computer readable medium could for example include an electrical connection (electronic) having one or more wires, a portable computer diskette (magnetic), a random access memory (RAM), a read-only memory (ROM), an erasable programmable read-only memory (EPROM) or Flash memory, an optical fiber, and a portable compact disc read-only memory (CDROM). In addition, the computer readable medium may even be paper or other suitable medium on which the program can be printed, as the paper or other suitable medium may for example be optically scanned, and then edited, interpreted or, if appropriate, processed in other suitable ways to obtain the program electronically and then stored in computer memory.

It should be understood that portions of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuit with logic gates for implementing logic functions on data signals, application specific integrated circuits with suitable combinational logic gates, Programmable Gate Array, Field Programmable Gate Array, and the like.

One of ordinary skill in the art will appreciate that all or a portion of the steps of the above-described embodiments may be performed by hardware associated with the program instructions, which may be stored in a computer readable storage medium, which, when executed, comprises executing one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

It should be noted that in the claims, the use of the verbs "comprise/include" and its conjugations does not exclude the presence of elements or steps not recited in a claim. The word "a" or "an" does not exclude a plurality.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure.

The invention claimed is:

1. An active stylus, comprising:
    a pen body,
    a pen head connected to the pen body,
    a first sensor disposed in at least one of the pen body and the pen head, the first sensor being configured to sense attitude information of the active stylus,
    a gas passage disposed in the pen body, the gas passage comprising an air inlet and an air outlet, both of which communicate with ambient environment, the air inlet being disposed at the end of the pen body away from the pen head, and the air outlet being only disposed at a side of the pen body, and
    a second sensor disposed in the gas passage, the second sensor being configured to sense at least one of a flow rate and pressure of a gas flow entering the gas passage.

2. The active stylus according to claim 1, wherein the second sensor comprises at least one of a varistor, a thin film transistor, and a MEMS based gas pressure sensor.

3. The active stylus according to claim 1, wherein the first sensor comprises at least one of a gyroscope and a gravity sensor.

4. The active stylus according to claim 1, wherein the pen head is wedge shaped.

5. The active stylus according to claim 1, further comprising a third sensor disposed in the pen head, the third sensor being configured to sense stress on a tip of the pen head.

6. A touch control device comprising the active stylus according to claim 1 and a touch control apparatus communicably connected to the active stylus;
    wherein the touch control apparatus comprises:
        a touch panel configured to obtain a touch position of the active stylus on the touch panel; and
        a painting and writing unit configured to generate a painting or calligraphy according to the touch position and the attitude information of the active stylus.

7. The touch control device according to claim 6, wherein the painting and writing unit comprises a first painting and writing subunit configured to:
    determine a width of a stroke according to the attitude information of the active stylus, and generate the painting or calligraphy according to the width of the stroke.

8. The touch control device according to claim 6, wherein the active stylus further comprises a third sensor disposed in the pen head, the third sensor being configured to sense stress on a tip of the pen head, and the painting and writing unit comprises a second painting and writing subunit configured to:
 determine a width of a stroke according to stress on the tip of the pen head, and
 generate a painting or calligraphy according to the width of the stroke.

9. The touch control device according to claim 6, wherein the painting and writing unit is further configured to generate a painting or calligraphy according to the touch position, the attitude information, and at least one of the flow rate and the pressure of the gas flow.

10. The touch control device according to claim 9, wherein the touch panel is a touch display screen and further configured to display the painting or calligraphy.

11. The touch control device according to claim 9, wherein the painting and writing unit further comprises a third painting and writing subunit configured to:
 determine an initial position of a virtual droplet according to the touch position,
 determine an initial size, a moving speed, and a moving distance of the virtual droplet according to at least one of the flow rate and the pressure of the gas flow;
 determine a position and orientation of the active stylus relative to the touch display screen according to the attitude information of the active stylus and a spatial position information of the touch panel, and determine a moving direction of the virtual droplet according to the position and orientation; and
 generate the painting or calligraphy according to the initial position, the initial size, the moving speed, the moving direction, and the moving distance of the virtual droplet.

12. The touch control device according to claim 11, further comprising a first storage unit configured to store a virtual painting paper, wherein the virtual painting paper comprises virtual rice paper, virtual printing paper, virtual coarse paper, virtual corrugated paper, and virtual coated paper, and the third painting and writing subunit is further configured to select the virtual painting paper from the first storage unit as a background of the painting or calligraphy.

13. The touch control device according to claim 12, further comprising a second storage unit configured to store a first table representing a relationship between the initial size and the moving speed of the virtual droplet and at least one of the flow rate and the pressure of the gas flow, a second table representing a degree of size reduction in the process of moving of the virtual droplet on different virtual painting paper, and a third table representing a diffusion length of the virtual droplet penetrating into the virtual painting paper in the process of moving of the virtual droplet on different virtual painting paper, and
 wherein the third painting and writing subunit is further configured to:
  determine the initial size, the moving speed, and the moving distance of the virtual droplet according to at least one of the flow rate and the pressure of the gas flow with reference to the first table; and
  generate the painting or calligraphy according to the initial position, the initial size, the moving direction, the moving speed, and the moving distance of the virtual droplet and virtual paper with reference to the second table and the third table.

14. A touch control method for an active stylus according to claim 1, comprising:
 obtaining a touch position and attitude information of the active stylus;
 generating a painting or calligraphy according to the touch position and attitude information of the active stylus; and
 displaying the painting or calligraphy.

15. The touch control method according to claim 14, wherein the generating a painting or calligraphy according to the touch position and attitude information of the active stylus comprises:
 determining a width of a stroke according to the touch position and the attitude information of the active stylus, and generating the painting or calligraphy according to the width of the stroke.

16. The touch control method according to claim 14, wherein the method further comprises obtaining at least one of a flow rate and pressure of the gas flow in the gas passage in the active stylus, and
 wherein the generating a painting or calligraphy according to the touch position and attitude information of the active stylus comprises:
 generating a painting or calligraphy according to the touch position, attitude information of the active stylus and the at least one of the flow rate and the pressure of the gas flow.

17. The touch control method according to claim 16, wherein the generating a painting or calligraphy according to the touch position, attitude information of the active stylus and the at least one of the flow rate and the pressure of the gas flow comprises:
 determining an initial position of the virtual droplet according to the touch position,
 determining an initial size, a moving speed, and a moving distance of the virtual droplet
 according to the at least one of the flow rate and the pressure of the gas flow;
 determining a position and orientation of the active stylus relative to the touch display screen according to the attitude information of the active stylus and the spatial position information of the touch panel, and determining a moving direction of the virtual droplet according to the position and orientation; and
 generating the painting or calligraphy according to the initial position, the initial size, the moving speed, the moving direction, and the moving distance of the virtual droplet.

18. The touch control method according to claim 14, further comprising:
 generating virtual painting paper as a background of the painting or calligraphy, wherein the virtual painting paper comprises virtual rice paper, virtual printing paper, virtual coarse paper, virtual corrugated paper, and virtual coated paper.

* * * * *